(12) United States Patent
Livshiz et al.

(10) Patent No.: US 7,463,970 B2
(45) Date of Patent: Dec. 9, 2008

(54) TORQUE BASED ENGINE SPEED CONTROL

(75) Inventors: Michael Livshiz, Ann Arbor, MI (US); Scott J. Chynoweth, Fenton, MI (US); Todd R. Shupe, Milford, MI (US); Christopher E. Whitney, Highland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 100 days.

(21) Appl. No.: 11/685,735

(22) Filed: Mar. 13, 2007

(65) Prior Publication Data

US 2008/0125951 A1    May 29, 2008

Related U.S. Application Data

(60) Provisional application No. 60/861,492, filed on Nov. 28, 2006.

(51) Int. Cl.
*G06F 19/00* (2006.01)
*F02D 41/00* (2006.01)

(52) U.S. Cl. .................... 701/114; 123/350; 123/399
(58) Field of Classification Search ............... 701/103, 701/114, 115; 123/334, 361, 350, 351, 399, 123/339.11

See application file for complete search history.

(56) References Cited

U.S. PATENT DOCUMENTS

| | | | |
|---|---|---|---|
| 6,305,350 B1 * | 10/2001 | Livshiz et al. | 123/339.11 |
| 6,349,700 B1 * | 2/2002 | Buckland et al. | 123/352 |
| 6,848,417 B2 * | 2/2005 | Surnilla et al. | 123/339.11 |
| 6,915,198 B2 * | 7/2005 | Phillips et al. | 701/54 |
| 6,947,824 B1 * | 9/2005 | Livshiz et al. | 701/103 |
| 7,000,589 B2 * | 2/2006 | Matthews et al. | 123/350 |
| 7,021,282 B1 * | 4/2006 | Livshiz et al. | 123/347 |
| 7,024,305 B2 * | 4/2006 | Stamm et al. | 701/114 |
| 2005/0098152 A1 * | 5/2005 | Surnilla et al. | 123/339.11 |
| 2007/0032340 A1 * | 2/2007 | Hrovat et al. | 477/107 |

* cited by examiner

*Primary Examiner*—John T Kwon

(57) ABSTRACT

A method of achieving a desired engine speed of an internal combustion engine includes determining the desired engine speed, calculating a slow response torque value based on the desired engine speed and calculating a fast response torque value based on the desired engine speed. A slow response actuator command and a fast response actuator command are generated based on the slow response torque value and the fast response torque value, respectively. Operation of the engine is regulated based on the slow response actuator command and the fast response actuator command to achieve the desired engine speed.

29 Claims, 3 Drawing Sheets

TORQUE BASED ENGINE SPEED CONTROL

CROSS-REFERENCE TO RELATED APPLICATIONS

This application is related to U.S. patent application Ser. No. 60/861,493, filed Nov. 28, 2006, entitled, "Engine Torque Control. This application claims the benefit of U.S. Provisional Application No. 60/861,492, filed on Nov. 28, 2006. The disclosures of the above applications are incorporated herein by reference.

FIELD

The present invention relates to engines, and more particularly to torque-based speed control of an engine.

BACKGROUND

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. As can be appreciated, increasing the air and fuel to the cylinders increases the torque output of the engine.

Engine control systems have been developed to accurately control engine speed output to achieve a desired engine speed. Traditional engine control systems, however, do not control the engine speed as accurately as desired. Further, traditional engine control systems do not provide as rapid of a response to control signals as is desired or coordinate engine torque control among various devices that affect engine torque output.

SUMMARY

Accordingly, the present disclosure provides a method of achieving a desired engine speed of an internal combustion engine. The method includes determining the desired engine speed, calculating a slow response torque value based on the desired engine speed and calculating a fast response torque value based on the desired engine speed. A slow response actuator command and a fast response actuator command are generated based on the slow response torque value and the fast response torque value, respectively. Operation of the engine is regulated based on the slow response actuator command and the fast response actuator command to achieve the desired engine speed.

In other features, the slow response actuator command is a desired throttle area. The method further includes determining a desired air per cylinder (APC) value based on the slow response torque value and determining the desired throttle area based on the desired APC and a manifold absolute pressure (MAP) of the engine.

In other features, the fast response actuator command is a desired spark timing. The method further includes determining the desired spark timing based on the fast response torque value and a measured APC of the engine.

In other features, the method further includes determining a minimum torque value based on the desired engine speed and a transmission gear ratio. The slow response torque value is determined based on the minimum torque value. The method further includes determining at least one of a reserve torque value, a feed-forward torque value and a proportional-integral torque value. The slow response torque is further based on the at least one of a reserve torque value, a feed-forward torque value and a proportional-integral torque value. The method further includes calculating an engine speed error based on a measured engine speed and the desired engine speed. The proportional-integral torque value is determined based on the engine speed error.

In still other features, the method further includes determining at least one of a reserve torque value, a run torque value and a proportional torque value. The fast response torque is further based on the at least one of a reserve torque value, a run torque value and a proportional torque value. The method further includes calculating an engine speed error based on a measured engine speed and the desired engine speed. The proportional torque value is determined based on the engine speed error.

In yet another feature, the method further includes limiting each of the slow response torque value and the fast response torque value between respective minimum and maximum values.

The present disclosure provides a torque-based engine speed control that improves the overall flexibility of the engine control system, simplifies the software requirements for implementing such control and provides for an automated calibration process. In this manner, overall implementation and development costs for an engine system can be reduced.

Further advantages and areas of applicability of the present disclosure will become apparent from the detailed description provided hereinafter. It should be understood that the detailed description and specific examples, while indicating an embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
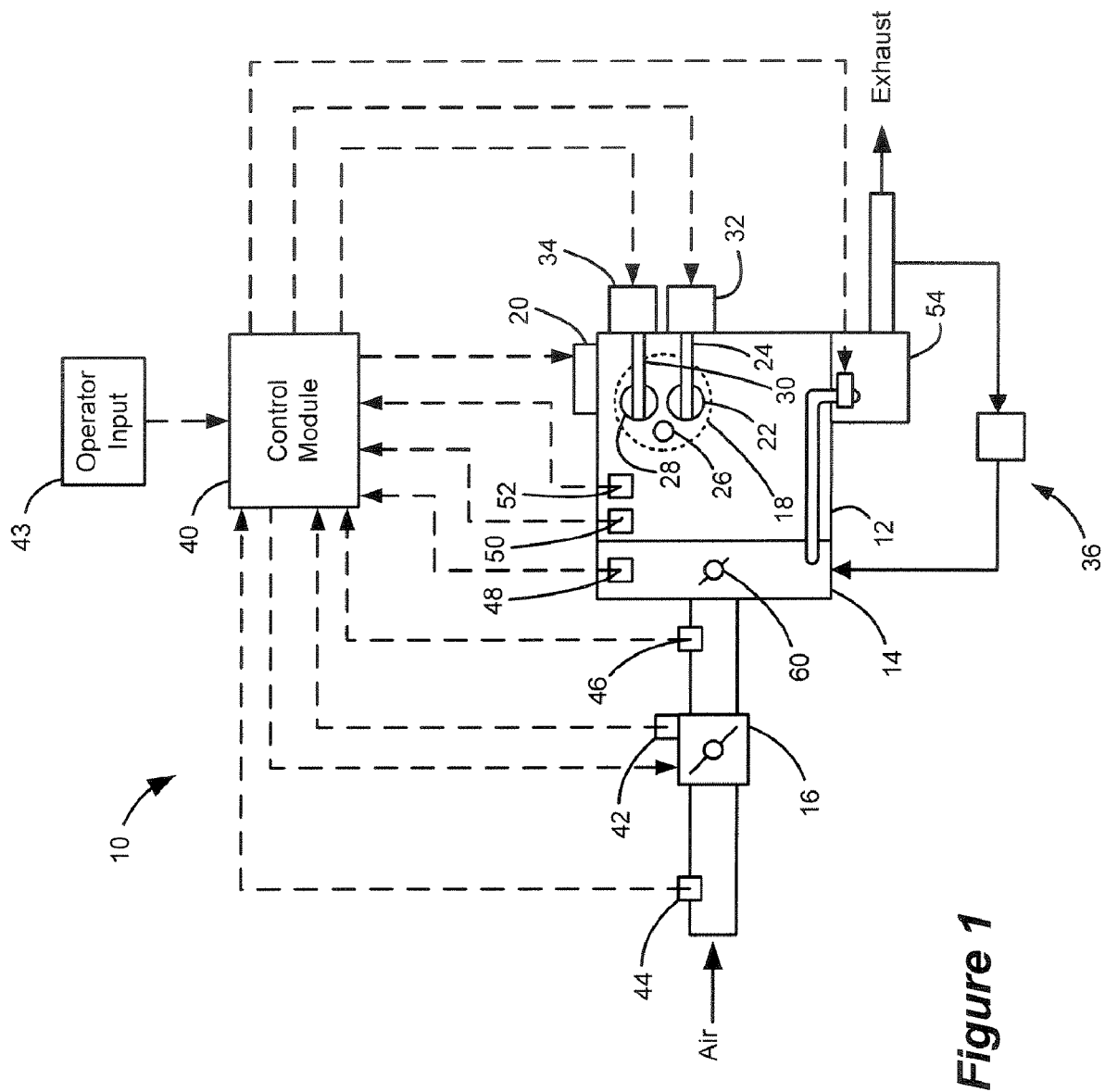
FIG. 1 is a schematic illustration of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, it can be appreciated that the coordinated torque control system of the present invention can be implemented in engines having a plurality of cylinders including, but not limited to, 2, 3, 4, 5, 6, 8, 10 and 12 cylinders.

A fuel injector (not shown) injects fuel that is combined with the air as it is drawn into the cylinder 18 through an intake port. The fuel injector may be an injector associated with an electronic or mechanical fuel injection system 20, a jet or port of a carburetor or another system for mixing fuel with intake air. The fuel injector is controlled to provide a desired air-to-fuel (A/F) ratio within each cylinder 18.

An intake valve 22 selectively opens and closes to enable the air/fuel mixture to enter the cylinder 18. The intake valve position is regulated by an intake cam shaft 24. A piston (not shown) compresses the air/fuel mixture within the cylinder 18. A spark plug 26 initiates combustion of the air/fuel mixture, which drives the piston in the cylinder 18. The piston, in turn, drives a crankshaft (not shown) to produce drive torque. Combustion exhaust within the cylinder 18 is forced out an exhaust port when an exhaust valve 28 is in an open position. The exhaust valve position is regulated by an exhaust cam shaft 30. The exhaust is treated in an exhaust system and is released to atmosphere. Although single intake and exhaust valves 22, 28 are illustrated, it can be appreciated that the engine 12 can include multiple intake and exhaust valves 22, 28 per cylinder 18.

The engine system 10 can include an intake cam phaser 32 and an exhaust cam phaser 34 that respectively regulate the rotational timing of the intake and exhaust cam shafts 24, 30. More specifically, the timing or phase angle of the respective intake and exhaust cam shafts 24, 30 can be retarded or advanced with respect to each other or with respect to a location of the piston within the cylinder 18 or crankshaft position. In this manner, the position of the intake and exhaust valves 22, 28 can be regulated with respect to each other or with respect to a location of the piston within the cylinder 18. By regulating the position of the intake valve 22 and the exhaust valve 28, the quantity of air/fuel mixture ingested into the cylinder 18 and therefore the engine torque is regulated.

The engine system 10 can also include an exhaust gas recirculation (EGR) system 36. The EGR system 36 includes an EGR valve 38 that regulates exhaust flow back into the intake manifold 14. The EGR system is generally implemented to regulate emissions. However, the mass of exhaust air that is recirculated back into the intake manifold 14 also affects engine torque output.

A control module 40 operates the engine based on the torque-based engine speed control of the present disclosure. More specifically, the control module 40 generates a throttle control signal and a spark advance control signal based on a desired engine speed ($RPM_{DES}$). A throttle position signal generated by a throttle position sensor (TPS) 42. An operator input 43, such as an accelerator pedal, generates an operator input signal. The control module 40 commands the throttle 16 to a steady-state position to achieve a desired throttle area ($A_{THRDES}$) and commands the spark timing to achieve a desired spark timing ($S_{DES}$). A throttle actuator (not shown) adjusts the throttle position based on the throttle control signal.

An intake air temperature (IAT) sensor 44 is responsive to a temperature of the intake air flow and generates an intake air temperature (IAT) signal. A mass airflow (MAF) sensor 46 is responsive to the mass of the intake air flow and generates a MAF signal. A manifold absolute pressure (MAP) sensor 48 is responsive to the pressure within the intake manifold 14 and generates a MAP signal. An engine coolant temperature sensor 50 is responsive to a coolant temperature and generates an engine temperature signal. An engine speed sensor 52 is responsive to a rotational speed (i.e., RPM) of the engine 12 and generates in an engine speed signal. Each of the signals generated by the sensors is received by the control module 40. The engine system 10 can also include a turbo or supercharger 54 that is driven by the engine 12 or engine exhaust.

The torque-based engine speed (RPM) control of the present disclosure achieves $RPM_{DES}$ based on $A_{THRDES}$ and $S_{DES}$. More specifically, the torque-based engine speed control regulates transitions between engine speed and torque control and engine speed control. As explained in further detail below, this is achieved through the application of open-loop torque control to transform an engine RPM command into different engine actuator commands including, but not limited to, spark timing (S), throttle position ($A_{THR}$) and cam phaser positions. This is further achieved through application of RPM feedback to maintain $RPM_{DES}$ under coast down, transition to engine RPM control and idle speed control conditions, as well as through calculating a minimum torque ($T_{MIN}$) required to maintain $RPM_{DES}$.

The torque-based engine RPM control determines a slow response requested torque value ($T_{REQSL}$) and a fast response requested torque value ($T_{REQFS}$). $T_{REQSL}$ is determined based on the following relationship:

$$T_{REQSL} = T_{RES} + T_{FF} + T_{MIN} + T_{PI} \tag{1}$$

where: $T_{RES}$ is a reserve torque;

$T_{FF}$ is a feed-forward torque;

$T_{MIN}$ is the minimum torque required to maintain $RPM_{DES}$; and $T_{PI}$ is a proportional-integral torque term.

$T_{RES}$ is an additional amount of torque that is incorporated to compensate for unknown loads that can suddenly load the engine. $T_{FF}$ is a feed-forward torque amount that indicates the additional amount of torque required as a result of a transmission range change (e.g., a change from neutral (N) to drive (D)). $T_{PI}$ is determined in accordance with the following relationship:

$$T_{PI} = k_P * RPM_{ERR} + k_I * \int RPM_{ERR} \tag{2}$$

where: $RPM_{ERR}$ is an RPM error;

$k_P$ is a proportional constant; and $k_I$ is an integral constant.

$RPM_{ERR}$ is determined as the difference between $RPM_{DES}$ and an actual RPM ($RPM_{ACT}$) measured by the engine RPM sensor 52. $T_{REQSL}$ is limited between minimum and maximum values based on the following relationship:

$$T_{REQSL} = \begin{bmatrix} T_{REQSL\_MAX}, \text{if} \rightarrow T_{REQSL} > T_{REQSL\_MAX} \\ T_{REQSL\_MIN}, \text{if} \rightarrow T_{REQSL} < T_{REQSL\_MIN} \end{bmatrix} \tag{3}$$

$T_{REQSL}$ is used to determine a slow response term using an inverse torque module. More specifically, a desired air per cylinder ($APC_{DES}$) value is determined by processing $T_{REQSL}$ through the inverse torque model, as is represented in the following relationship:

$$APC_{DES} = T^{-1}(T_{REQSL}, S_{UM}, I, E, RPM) \tag{4}$$

where: $S_{UM}$ is an un-managed spark timing term;

I is the intake cam phase angle; and

E is the exhaust cam phase angle.

To improve the stability of the control, $APC_{DES}$ is filtered using a low-pass filter to provide a filtered $APC_{DES}$.

The filtered $APC_{DES}$ is processed using a compressed flow (CF) model to provide a desired throttle area ($A_{THRDES}$). More specifically, a desired mass air flow ($MAF_{DES}$) is determined based on the following relationship:

$$MAF_{DES} = \frac{APC_{DES(FILT)} \cdot R}{k_{CYL}} \tag{5}$$

where $k_{CYL}$ is a cylinder constant. For example, $k_{CYL}$ is equal to 15 for an 8-cylinder engine, 20 for a 6-cylinder engine and 15 for a 4-cylinder engine. $A_{THRDES}$ is determined based on the following relationship:

$$A_{THRDES} = \frac{MAF_{DES} * \sqrt{R \cdot T_{AMB}}}{B \cdot \Phi \cdot \left(\frac{MAP}{B}\right)} \tag{6}$$

where B is the measured barometric pressure, $T_{AMB}$ is the ambient air temperature and $\Phi$ is based on a pressure ratio ($P_R$) according to the following relationships:

$$\Phi = \begin{cases} \sqrt{\frac{2\gamma}{\gamma-1}\left(1-P_R^{\frac{\gamma-1}{\gamma}}\right)} & \text{if } P_R > P_{critical} = \left(\frac{2}{\gamma+1}\right)^{\frac{\gamma}{\gamma-1}} = 0.528 \\ \sqrt{\gamma\left(\frac{2}{\gamma+1}\right)^{\frac{\gamma-1}{(\gamma-1)}}} & \text{if } P_R \le P_{critical} \end{cases} \tag{7}$$

$P_R$ is the ratio of MAP to the ambient pressure ($P_{AMB}$) and $P_{CRITICAL}$. $P_{CRITICAL}$ is defined as the pressure ratio at which the velocity of the air flowing past the throttle equals the velocity of sound. This condition is called choked or critical flow. The critical pressure ratio is determined by:

$$P_{CRITICAL} = \left(\frac{2}{\gamma+1}\right)^{\gamma/\gamma-1} \tag{8}$$

where $\gamma$ is equal to the ratio of specific heats for air and range from about 1.3 to about 1.4.

The torque-based engine RPM control determines $T_{REQFS}$ based on the following relationship:

$$T_{REQFS} = T_{RUN} - T_{RES} + T_P \tag{9}$$

where: $T_{RUN}$ is a run torque value; and $T_P$ is a proportional torque value.

$T_{RUN}$ is determined based on the following relationship:

$$T_{RUN} = f(APC_{ACT}, RPM, S_{UM}, I, E) \tag{10}$$

where $APC_{ACT}$ is that actual air per cylinder value and is determined based on the MAF signal. $T_P$ is determined based on the following relationship:

$$T_P = k_{FP} \cdot RPM_{ERR} \tag{11}$$

where $k_{FP}$ is a proportional constant for the fast term. $T_{REQFS}$ is limited between minimum and maximum values based on the following relationships:

$$T_{REQFS} = \begin{bmatrix} T_{REQFS\_MAX}, \text{ if } \to T_{REQFS} > T_{REQFS\_MAX} \\ T_{REQFS\_MIN}, \text{ if } \to T_{REQFS} < T_{REQFS\_MIN} \end{bmatrix} \tag{12}$$

The desired spark timing ($S_{DES}$) is determined based on the following relationship:

$$S_{DES} = T_s^{-1}(T_{REQFS}, APC_{ACT(FILT)}, R, I, S) \tag{13}$$

where $APC_{DES}$ is filtered using a low-pass filter to provide a filtered $APC_{DES(FILT)}$. In this manner, the stability of the control is improved. $S_{DES}$ is limited based on the following relationships:

$$S_{DES} = \begin{bmatrix} S_{MAX}, \text{ if } \to S > S_{MAX} \\ S_{MIN}, \text{ if } \to S < S_{MIN} \end{bmatrix} \tag{14}$$

The torque-based engine RPM control subsequently regulates engine operation based on $A_{THRDES}$ and $S_{DES}$ to achieve $RPM_{DES}$.

Figure 2:
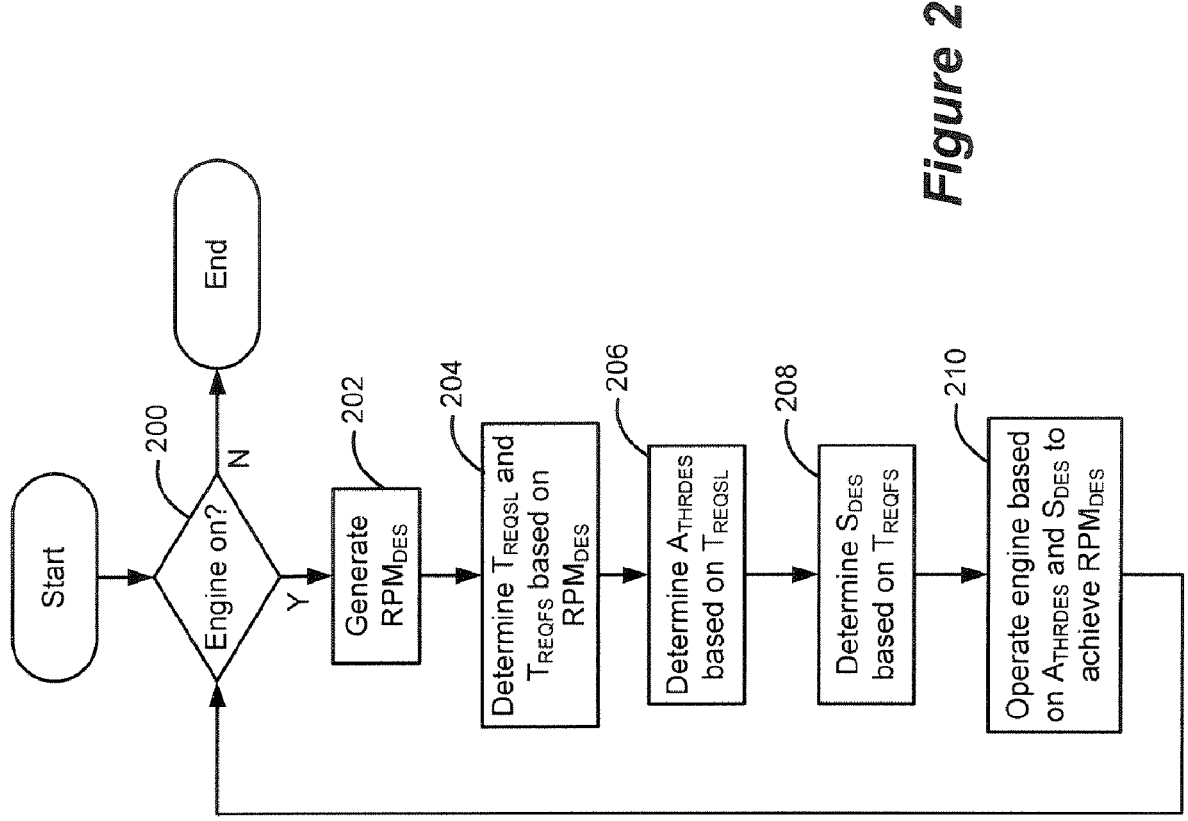
FIG. 2 is a flowchart illustrating steps executed by the torque-based engine speed control of the present disclosure.

Referring now to FIG. 2, exemplary steps executed by the torque-based engine speed control will be discussed in further detail. In step 200, control determines whether the engine is on (i.e., running). If the engine is not one, control ends. If the engine is on, control generates $RPM_{DES}$ in step 202. In step 204, control determines $T_{REQSL}$ and $T_{REQFS}$ based on $RPM_{DES}$, as described in detail above. $A_{THRDES}$ is determined based on $T_{REQSL}$ in step 206, as described in detail above. In step 208, control determines $S_{DES}$ based on $T_{REQFS}$, as described in detail above. Control operates the engine based on $A_{THRDES}$ and $S_{DES}$ to achieve $RPM_{DES}$ in step 210 and control loops back to step 200.

Figure 3:
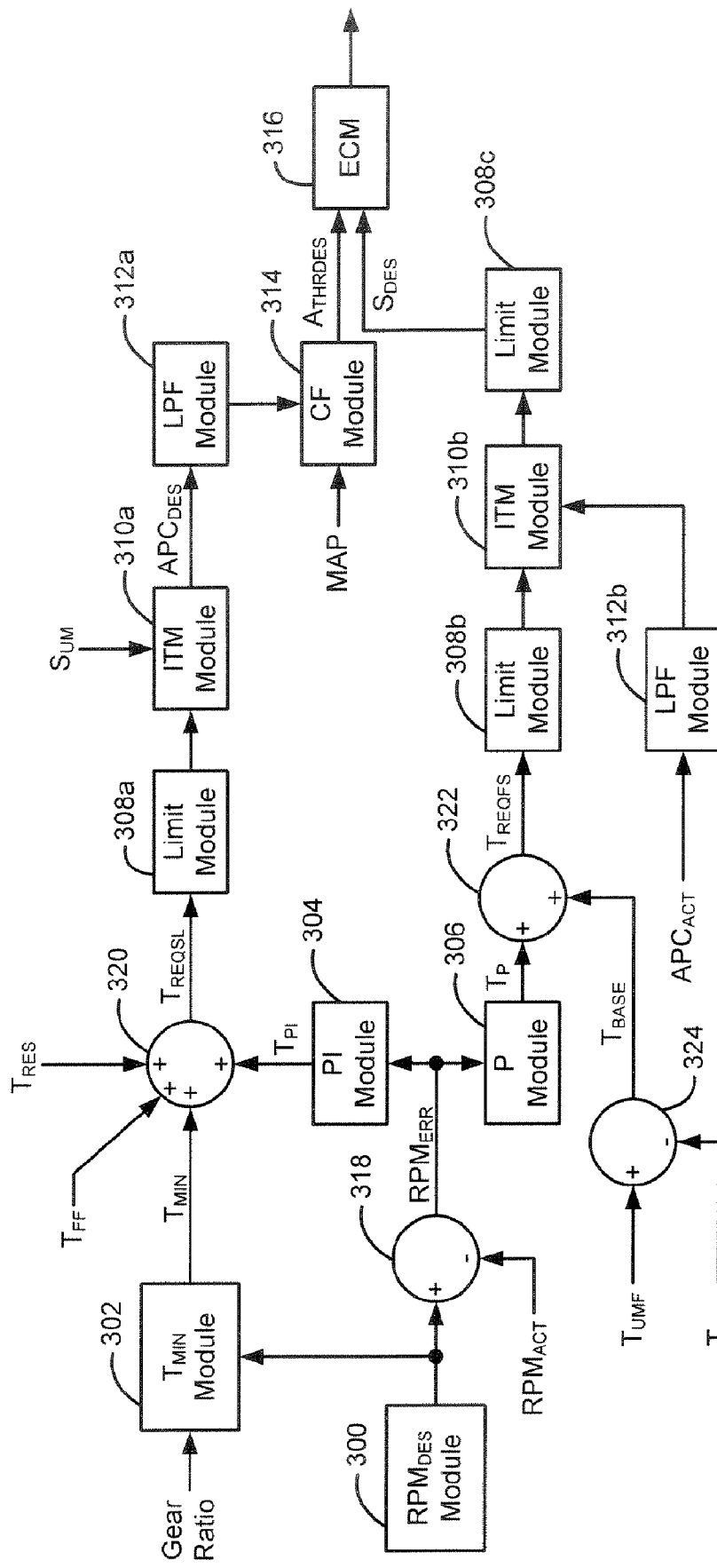
FIG. 3 is a block diagram illustrating modules that execute the torque-based engine speed control of the present disclosure.

Referring now to FIG. 3, exemplary modules that execute the torque-based engine speed control will be discussed. The exemplary modules include an $RPM_{DES}$ module 300, a $T_{MIN}$ module 302, a proportional-integral (PI) module 304, a proportional (P) module 306, limiting modules 308a, 308b, 308c, inverse torque model (ITM) modules 310a, 310b, low-pass filter (LPF) modules 312a, 312b, a compressed flow (CF) module 314 and an engine control module (ECM) 316.

The $RPM_{DES}$ module 300 generates $RPM_{DES}$ based on a standard block of RPM control described in detail in commonly assigned U.S. Pat. No. 6,405,581 B1, issued on Jun. 18, 2002 and entitled System and Method of Controlling the Coastdown of a Vehicle, the disclosure of which is expressly incorporated herein by reference. $RPM_{DES}$ is output to the $T_{MIN}$ module 302 and a summer module 318. The $T_{MIN}$ 302 module determines $T_{MIN}$, for example, from a look-up table, based on $RPM_{DES}$ and a current transmission gear ratio. $T_{MIN}$ is output to a summer module 320.

The summer module 318 determines an RPM error ($RPM_{ERR}$) as the difference between $RPM_{DES}$ and an actual RPM ($RPM_{ACT}$). $RPM_{ACT}$ is determined using the engine RPM sensor 52. $RPM_{ERR}$ is output to the PI module 304 and the P module 306. The PI module 304 determines $T_{PI}$ and the P module determines $T_P$, as described above. $T_{PI}$ is output to the summer module 320 and $T_P$ is output to a summer module 322. A summer module 324 determines a base torque ($T_{BASE}$) as the difference between an unmanaged-filtered torque ($T_{UMF}$) and $T_{RES}$. $T_{BASE}$ is output to the summer module 322.

The summer module 320 determines $T_{REQSL}$ as the sum of $T_{RES}$, $T_{FF}$, $T_{MIN}$ and $T_{PI}$. $T_{REQSL}$ is output to the limiting module 308a, which limits the value of $T_{REQSL}$ between minimum and maximum values, as described in detail above. The limited $T_{REQSL}$ is output to the ITM module 310a, which determines $APC_{DES}$ based on $T_{REQSL}$, $S_{UM}$ and other parameters, as discussed in detail above. $APC_{DES}$ is filtered in the LPF module 312a and is output to the CF module 314. The CF module 314 determines $A_{THRDES}$ based on the filtered $APC_{DES}$ and MAP, as described above. $A_{THRDES}$ is output to the ECM 316.

The summer module 322 determines $T_{REQFS}$ as the sum of $T_P$ and $T_{ERR}$. $T_{REQFS}$ is output to the limiting module 308b. The limiting module 308b limits the value of $T_{REQFS}$ between minimum and maximum values, as described in detail above. The LPF module 312b filters $APC_{ACT}$ and outputs the filtered $APC_{ACT}$ to the ITM module 310b. The limited $T_{REQFS}$ is output to the ITM module 310b, which determines $S_{DES}$ based on $T_{REQFSL}$, the filtered $APC_{ACT}$ and other parameters, as discussed in detail above. The limiting module 308c limits the value of $S_{DES}$ between minimum and maximum values, as described in detail above. The limited $S_{DES}$ is output to the ECM 316. The ECM 316 generates control signals based on $A_{THRDES}$ and $S_{DES}$ to achieve $RPM_{DES}$.

The torque-based engine speed control of the present disclosure improves the overall flexibility of the engine control system, simplifies the software requirements for implementing such control and provides for an automated calibration process. In this manner, overall implementation and development costs for an engine system can be reduced.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of achieving a desired engine speed of an internal combustion engine, comprising:
    determining said desired engine speed;
    calculating a slow response torque value based on said desired engine speed;
    calculating a fast response torque value based on said desired engine speed;
    generating a slow response actuator command and a fast response actuator command based on said slow response torque value and said fast response torque value, respectively; and
    regulating operation of said engine based on said slow response actuator command and said fast response actuator command to achieve said desired engine speed.

2. The method of claim 1 wherein said slow response actuator command is a desired throttle area.

3. The method of claim 2 further comprising:
    determining a desired air per cylinder (APC) value based on said slow response torque value; and
    determining said desired throttle area based on said desired APC and a manifold absolute pressure (MAP) of said engine.

4. The method of claim 1 wherein said fast response actuator command is a desired spark timing.

5. The method of claim 4 further comprising determining said desired spark timing based on said fast response torque value and a measured APC of said engine.

6. The method of claim 1 further comprising determining a minimum torque value based on said desired engine speed and a transmission gear ratio, wherein said slow response torque value is determined based on said minimum torque value.

7. The method of claim 6 further comprising determining at least one of a reserve torque value, a feed-forward torque value and a proportional-integral torque value, wherein said slow response torque is further based on said at least one of a reserve torque value, a feed-forward torque value and a proportional-integral torque value.

8. The method of claim 7 further comprising calculating an engine speed error based on a measured engine speed and said desired engine speed, wherein said proportional-integral torque value is determined based on said engine speed error.

9. The method of claim 1 further comprising determining at least one of a reserve torque value, a run torque value and a proportional torque value, wherein said fast response torque is further based on said at least one of a reserve torque value, a run torque value and a proportional torque value.

10. The method of claim 9 further comprising calculating an engine speed error based on a measured engine speed and said desired engine speed, wherein said proportional torque value is determined based on said engine speed error.

11. The method of claim 1 further comprising limiting each of said slow response torque value and said fast response torque value between respective minimum and maximum values.

12. A control system for achieving a desired engine speed of an internal combustion engine, comprising:
    a first module that determines said desired engine speed;
    a second module that calculates a slow response torque value based on said desired engine speed;
    a third module that calculates a fast response torque value based on said desired engine speed;
    a fourth module that generates a slow response actuator command and a fast response actuator command based on said slow response torque value and said fast response torque value, respectively; and
    a fifth module that regulates operation of said engine based on said slow response actuator command and said fast response actuator command to achieve said desired engine speed.

13. The control system of claim 12 wherein said slow response actuator command is a desired throttle area.

14. The control system of claim 13 further comprising a sixth module that determines a desired air per cylinder (APC) value based on said slow response torque value, wherein said fourth module determines said desired throttle area based on said desired APC and a manifold absolute pressure (MAP) of said engine.

15. The control system of claim 12 wherein said fast response actuator command is a desired spark timing.

16. The control system of claim 15 further comprising a sixth module that determines said desired spark timing based on said fast response torque value and a measured APC of said engine.

17. The control system of claim 12 further comprising a sixth module that determines a minimum torque value based on said desired engine speed and a transmission gear ratio, wherein said slow response torque value is determined based on said minimum torque value.

18. The control system of claim 17 wherein at least one of a reserve torque value, a feed-forward torque value and a proportional-integral torque value is determined, and wherein said slow response torque is further based on said at least one of a reserve torque value, a feed-forward torque value and a proportional-integral torque value.

19. The control system of claim 18 further comprising a seventh module that calculates an engine speed error based on a measured engine speed and said desired engine speed, wherein said proportional-integral torque value is determined based on said engine speed error.

20. The control system of claim 12 wherein at least one of a reserve torque value, a run torque value and a proportional torque value is determined, and wherein said fast response torque is further based on said at least one of a reserve torque value, a run torque value and a proportional torque value.

21. The control system of claim 20 further comprising a sixth module that calculates an engine speed error based on a measured engine speed and said desired engine speed, wherein said proportional torque value is determined based on said engine speed error.

22. The control system of claim 12 further comprising limiting modules that respectively limit each of said slow response torque value and said fast response torque value between respective minimum and maximum values.

23. A method of achieving a desired engine speed of an internal combustion engine, comprising:
   determining said desired engine speed;
   determining a minimum torque value based on said desired engine speed and a transmission gear ratio;
   calculating a slow response torque value based on said desired engine speed and said minimum torque value;
   calculating a fast response torque value based on said desired engine speed;
   generating a desired throttle area command and a desired spark timing command based on said slow response torque value and said fast response torque value, respectively; and
   regulating operation of said engine based on said desired throttle area command and said desired spark timing command to achieve said desired engine speed.

24. The method of claim 23 further comprising:
   determining a desired air per cylinder (APC) value based on said slow response torque value; and
   determining said desired throttle area based on said desired APC and a manifold absolute pressure (MAP) of said engine.

25. The method of claim 23 further comprising determining said desired spark timing based on said fast response torque value and a measured APC of said engine.

26. The method of claim 23 further comprising determining at least one of a reserve torque value, a feed-forward torque value and a proportional-integral torque value, wherein said slow response torque is further based on said at least one of a reserve torque value, a feed-forward torque value and a proportional-integral torque value.

27. The method of claim 26 further comprising calculating an engine speed error based on a measured engine speed and said desired engine speed, wherein said proportional-integral torque value is determined based on said engine speed error.

28. The method of claim 23 further comprising determining at least one of a reserve torque value, a run torque value and a proportional torque value, wherein said fast response torque is further based on said at least one of a reserve torque value, a run torque value and a proportional torque value.

29. The method of claim 28 further comprising calculating an engine speed error based on a measured engine speed and said desired engine speed, wherein said proportional torque value is determined based on said engine speed error.

* * * * *